United States Patent
Medlock

(10) Patent No.: US 7,280,582 B2
(45) Date of Patent: *Oct. 9, 2007

(54) APPARATUS AND METHOD FOR SUB-CHIP OFFSET CORRELATION IN SPREAD-SPECTRUM COMMUNICATION SYSTEMS

(75) Inventor: Joel D. Medlock, Campbell, CA (US)

(73) Assignee: Infineon Technologies AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/101,171

(22) Filed: Apr. 7, 2005

(65) Prior Publication Data

US 2006/0018371 A1  Jan. 26, 2006

Related U.S. Application Data

(63) Continuation of application No. 09/772,580, filed on Jan. 29, 2001, now Pat. No. 6,895,036.

(60) Provisional application No. 60/178,813, filed on Jan. 28, 2000.

(51) Int. Cl.
 *H04B 1/707* (2006.01)

(52) U.S. Cl. .................. 375/142; 375/147; 375/343
(58) Field of Classification Search ............... 375/130, 375/140–143, 147, 150, 316, 340, 343, 152
See application file for complete search history.

(56) References Cited

U.S. PATENT DOCUMENTS

| 5,654,980 A | * | 8/1997 | Latva-aho et al. | ........... 375/148 |
| 5,796,776 A | * | 8/1998 | Lomp et al. | .................. 375/222 |
| 6,895,036 B2 | * | 5/2005 | Medlock | ...................... 375/142 |

* cited by examiner

*Primary Examiner*—Kevin Burd
(74) *Attorney, Agent, or Firm*—Dickstein Shapiro LLP

(57) ABSTRACT

An embodiment of the present invention described in the specification and the drawings is an apparatus and method for code correlation in spread spectrum communication systems. The apparatus receives a data sequence, and offsets the data sequence with a fixed sub-chip delay. The data sequence and the offset data sequence are each despread with a locally generated code sequence. The despread results are summed and accumulated. The accumulated results may then be used to achieve a lower "miss" probability during code correlation.

9 Claims, 5 Drawing Sheets

APPARATUS AND METHOD FOR SUB-CHIP OFFSET CORRELATION IN SPREAD-SPECTRUM COMMUNICATION SYSTEMS This application claims priority to the provisional patent application entitled, "Method and Apparatus for Correlating Codes in CDMA Systems", Ser. No. 60/178,813, filed Jan. 28, 2000, and is a continuation application of application Ser. No. 09/772,580, filed Jan. 29, 2001, now U.S. Pat. No. 6,895,036.

BRIEF DESCRIPTION OF THE INVENTION

This invention relates generally to wireless communication systems. More particularly, this invention relates to a method and apparatus for correlating codes in a spread spectrum communication system.

BACKGROUND OF THE INVENTION

Mobile stations of cellular and personal communications systems need to acquire certain cell-specific information before negotiating service with a serving base station. The base stations are strategically placed in a geographical area (based on capacity and coverage requirements), and each base station transmits the necessary cell-specific information. In spread-spectrum systems, the cell-specific information is carried by the pilot and/or synchronization channels. The synchronization channels are spread with pseudo-random or Gold code sequences, which form the basis for the mobile station's frame, slot and bit timing synchronization. The sequences also identify the base station. At power-up, the mobile station needs to search over the set of known system-specific codes to identify the serving base station and to achieve frequency, time and frame/slot synchronization.

Due to the combined presence of natural noise, the non-ideal characteristics of circuits in the mobile station, and other anomalies, search and synchronization processes are statistical in nature. The system designer must therefore optimize the design with respect to the following performance metrics: average (mean) and maximum search times; $P_d$, which is the probability of the correct identification of the serving base station, $P_m$, which is the probability of missed identification of the serving base station given a correct signal; and $P_f$, which is the probability of falsely identifying a base station that in fact is not visible to the mobile station.

To keep search times within practical limits, methods of searching over a portion of the pertinent code "spaces" are used in practice. A shortcoming with prior art approaches is that these methods result in a poor compromise among the above parameters. For example, for reasonably high $P_d$ and low $P_f$, search times are undesirably high. Conversely, for reasonable search times, $P_d$ may be less than desired, or $P_f$ may be excessive.

Accordingly, what is needed is an improved search and synchronization method and apparatus that can achieve a low "miss" probability within a short search time.

SUMMARY OF THE INVENTION

The present invention is a method and an apparatus for code correlation in a spread spectrum communication system. In one embodiment, the apparatus includes an input for receiving an input data sequence, a sub-chip delay circuit for generating a data sequence that is offset by a fraction of a chip relative to the input data sequence, a despreader circuit for despreading the input data sequence with a locally generated code sequence to produce a first despread result, a second despreader circuit for despreading the offset data sequence with the local code sequence to produce a second despread result. The apparatus also includes a first sum-and-accumulate circuit for adding the first despread result with the second despread result to produce a summed result. The summed result allows a code match to be more easily detected by code correlation algorithms. As a result, a lower "miss" probability can be achieved.

In another embodiment, the present invention provides a method of determining a sub-chip offset of a signal in a spread spectrum communication system. According to this embodiment, a first data sequence, a second data sequence and a third data sequence are generated from the signal. The first data sequence and the second data sequence are offset by a fraction of a chip; and, the first data sequence and the third data sequence are offset by twice the offset between the first and second data sequences. The first data sequence, the second data sequence and the third data sequence are each despread with a locally generated code sequence in parallel to respectively produce a first despread result, a second despread result and a third despread result. The first and second despread results are summed and the second and third despread results are summed. The summed results are then accumulated over a pre-determined period of time to produce accumulated results, which may be used in analyzing whether the locally generated code sequence matches the spreading code of the signal.

An advantage of the invention is a reduction in "miss" probability experienced when correlating codes.

Another advantage of the disclosed technology is a reduction in the maximum mean time for code acquisition.

Still another advantage of the invention is that no additional bits in the binary representation are required to represent the maximum hit value.

BRIEF DESCRIPTION OF THE DRAWINGS

For a better understanding of the invention, reference should be made to the following detailed description taken in conjunction with the accompanying drawing, in which.

Like reference numerals refer to corresponding parts throughout the drawing.

DETAILED DESCRIPTION OF THE PREFERRED EMBODIMENTS

Figure 1:
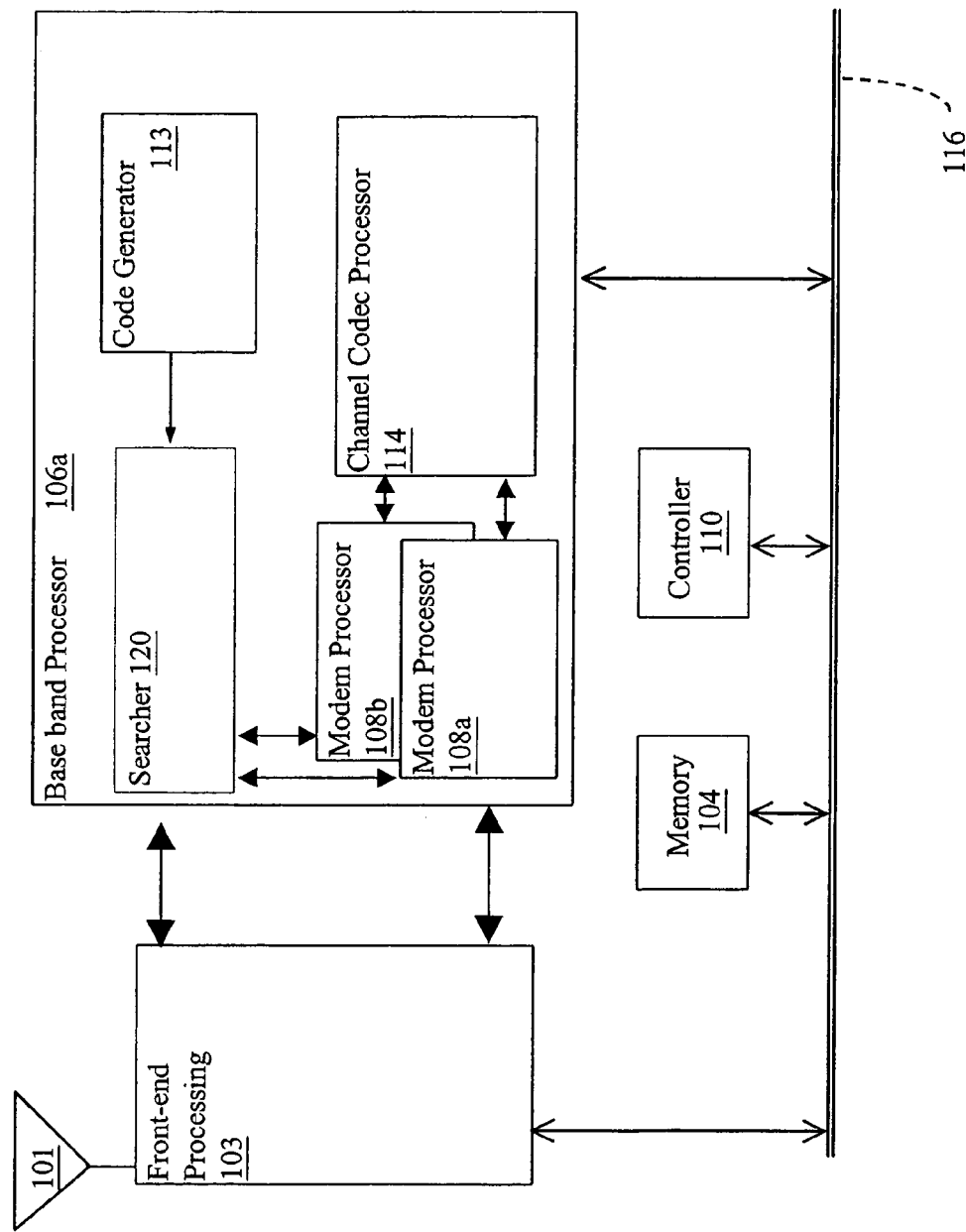
FIG. 1 is a block diagram of a spread spectrum communication device in which embodiments of the present invention may be practiced.

Reference will now be made in detail to the preferred embodiments of the invention. Examples of the preferred embodiment are illustrated in the accompanying drawings.

While the invention will be described in conjunction with the preferred embodiments, it is understood that the description is not intended to limit the invention to these embodiments. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits are not described in detail so as to avoid obscuring aspects of the present invention.

The present invention can be implemented in a wide variety of digital spread-spectrum wireless communication systems or techniques. These systems or techniques include, but are not limited to, fixed wireless, unlicenced Federal Communications Commission (FCC) wireless systems, wireless local area network (W-LAN), cordless telephony, cellular telephony, personal base station, telemetry, and other digital data processing applications. The present invention can be applied to both transmitters, (e.g., a base station or a handset) and receivers (e.g., a terminal).

In particular, one fixed wireless application to which the present invention may be applied is a metropolitan multipoint distribution system (MMDS). Examples include wireless cable broadcast, or two-way wireless local loop (WLL) systems. Examples of a W-LAN standard to which the present invention can be applied include Open Air and IEEE (Institute of Electrical and Electronics Engineers) specification 802.11b. With respect to unlicenced FCC applications, the present invention may be applied to specific instances such as the Industrial, Scientific, and Medical band (ISM) devices, which can include cordless telephony products. Personal base stations can utilize either cordless or cellular telephony wireless communication standards. Lastly, the cellular telephony systems in which the present invention can be applied include, but is not limited to, IS-95, IS2000, ARIB, 3GPP-FDD, 3GPP-TDD, 3GPP2, 1EXTREME, or other protocols.

Overview of the Sub-chip Offset Correlation

Wireless devices can be roughly classified as either a base station or a handset. A base station is usually fixed and acts as a hub to communicate with multiple handsets, which are sometimes mobile. Depending on the application, base stations (and some handsets) transmit a standardized pilot signal having a known sequence of binary digits to aid in the communication of data signals. These pilot signals can have a wide variety of codes, as determined by the specific communication protocol used by the base stations or handsets.

For example, in IS-95 CDMA systems, a pilot signal has a length of 32,768 bits (or chips). This known sequence is also known as a short pseudorandom noise (PN) sequence. Because all the base stations configured for this protocol transmit the same PN signal over the same bandwidth, they distinguish themselves by transmitting the PN signal with a unique offset, or phase, relative to each other. Given the noise-like quality of the PN sequences, only by matching the phase of the known PN sequence precisely, e.g., within about one chip, will a communication device detect the pilot signal. The matching procedure is also referred to as a search procedure.

One problem with the search procedure is that the received data may not be synchronized with the locally generated codes at chip boundaries. The chips of the locally generated codes may begin at a fraction of a chip earlier or later with respect to the pilot signal. As a result, search "misses" may occur even when the correct code sequences are used in despreading the data. This problem is known as sub-chip offset. Other problems that may compromise the accuracy of the search procedure include non-identical spreading codes, frequency offset, correlation window size less than the full period of the spreading code, etc.

In a conventional searcher, incoming data is correlated with a locally generated pseudorandom noise (PN) sequence. The incoming data is delayed by a fraction of a chip and the delayed data is correlated with the locally generated PN sequence. In a conventional searcher, the two correlation results are analyzed separately and the analysis result is used in detecting a code match.

According to the present invention, further reduction of the "miss" probability can be achieved if data streams that are offset by a fraction of a chip are added and correlated as opposed to correlating each sub-chip offset data stream individually.

Furthermore, the average time for achieving code acquisition may also be substantially reduced. The equation for the time average of the autocorrelation function is given as:

$$\text{Time average of autocorrelation} = \left[1 - \left(1 + \frac{1}{N}\right) \times \frac{|\epsilon|}{T_c}\right]^2$$

where N is the sequence length, $\epsilon$ is the sub-chip offset in fractions of a chip, and $T_c$ is one chip period. As can be seen from the equation, reducing the sub-chip offset will reduce the time average of autocorrelation.

Although "miss" probability can be significantly reduced by using techniques of the present invention, precision may be compromised. Each result combines at least two sub-chip sequences and the phase uncertainty is twice the sub-chip offset. Thus, the technique of the present invention should be used for coarse searching.

Communication Device in Accordance with the Present Invention

FIG. 1 is a block diagram of a spread spectrum communication device in accordance with one embodiment of the present invention. Electronic communication device 100*a* may be part of a wireless mobile handset. Electronic communication device 100*a* may also be a part of a wireless base station, an embedded wireless modem, a test platform, or other communication device. Electronic communication device 100*a* may also be any electronic device that performs a function of identifying a phase offset of a signal with a known data sequence, e.g., a pilot signal.

As illustrated in FIG. 1, communication device 100*a* includes an antenna 101 coupled to a front-end processing block 103 to receive a wireless signal. Front-end processing block 103 includes components such as a radio frequency (RF) transceiver (not shown) and an analog to digital (A/D) converter (not shown), coupled to each other in series. The components and functions of the front-end processing block 103 are known to those skilled in the art. Front-end processing block 103 is coupled to a base band processor 106*a* and a bus 116, to which a memory 104 and a processor (or controller) 110 are also coupled.

Base band processor 106*a*, which is operable to process the base band portion of the received signal, includes components such as modem processors 108*a* and 108*b*, a channel codec processor 114, and a searcher 120. Base band processor 106*a* also includes a code generator 113 coupled to the searcher 120. It is appreciated that modem processors 108a and 108b, codec processor 114, and code generator 113 have components that are known to those skilled in the art.

Searcher 120 is a device that performs the function of correlating incoming data with locally generated code sequences. When a correlation is found, the communication device 100a is synchronized with the incoming data. In particular, the searcher 120 of the present embodiment performs a sub-chip correlation. By performing sub-chip correlation, searcher 120 is able to improve overall performance of communication device 100a.

While communication device 100a provides a specific quantity of components that are arranged in a specific configuration, the present invention is well suited to a wide range of alternatives. For example, a single modem processor is used in one embodiment, while another embodiment utilizes greater than two modem processors, coupled to searcher 120. Furthermore, communication device 100a is adaptable to a wireless system utilizing code division multiple access (CDMA) protocol in one embodiment. However, communication device 100a is well suited to other spread spectrum communication protocols.

Apparatus for Performing Sub-chip Offset Correlation

Figure 2A:
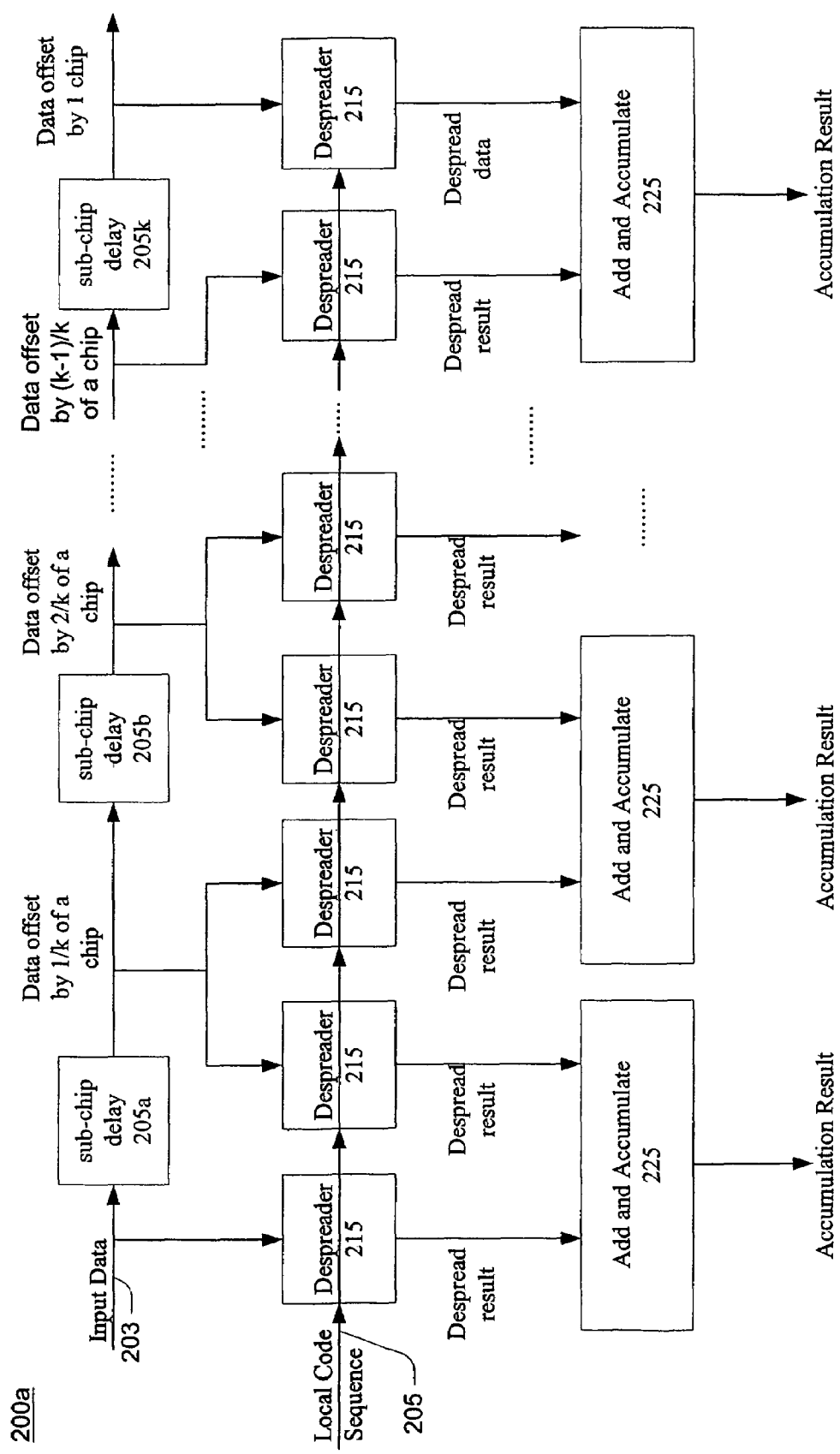
FIG. 2A is a block diagram illustrating a sub-chip correlation circuit according to an embodiment of the present invention.

FIG. 2A is a block diagram illustrating an apparatus 200a for performing sub-chip correlation in accordance with an embodiment of the present invention. The apparatus 200a may be implemented as part of the searcher 120 of communication device 100a. As illustrated, an input data stream (from front end processing 130) is received on bus 203 and is applied to a plurality of sub-chip delay circuits 205a-205k. The sub-chip delay circuits (except circuit 205k) each generate a data stream that is offset by a fraction of a chip with respect to the input data. For example, the sub-chip delay circuit 205a generates a data stream that is offset by 1/k of a chip with respect to the input data stream, and the sub-chip delay circuit 205b generates another data stream that is offset by 2/k of a chip with respect to the input data stream. The sub-chip delay circuit 205k generates data that is offset by one chip. It should be appreciated that the sub-chip delay circuits may be implemented as a memory buffer (e.g., a FIFO) where the data streams are tapped at different points of the buffer. Note that the input data, in the present embodiment, is sampled at a minimum of k-times the chip rate in order to achieve sub-chip resolution.

The sub-chip offset data streams generated by the sub-chip delay circuits 205a-205k are each provided to at least one despreader circuit 215. Particularly, as illustrated in FIG. 2A, the sub-chip offset data streams (except the data stream with an offset of one chip) are each provided to two despreader circuits 215. Each of the despreader circuit 215 then despreads a data stream with a locally generated code sequence (received via bus 205) to produce despread data. Despreaders are well known in the art. A description of an exemplary despreader circuit may be found in co-pending U.S. patent application Ser. No. 09/751,785, now U.S. Pat. No. 6,934,319, which is entitled "A Configurable Multimode Despreader for Spread Spectrum Applications," and which is assigned to the present assignee.

The despread results generated from the input data stream and from the offset data streams are then provided to sum-and-accumulate circuits 225 to be summed. Specifically, despread results generated from adjacent sub-chip delayed data streams that are offset by 1/k of a chip are added together by sum-and-accumulate circuits 225. The sums of the despread results are also accumulated for a pre-determined period of time. For example, assuming that the despread result for the input data sequence is $A_i$ and the despread result for the data stream that is delayed by 1/k of a chip is $B_i$, and assuming that N despread iterations are performed during that period, the accumulated result will be given by the following equation:

$$\text{Accumulated Result} = \sum_{i=1}^{N}(A_i + B_i)$$

The accumulated results generated by the sum-and-accumulate circuits 225 may then be compared against pre-determined threshold value(s) and analyzed by code correlation algorithms in detecting whether there is a code match. In the present embodiment, the base band processor 106a and appropriate software therein may be used for the analysis. In other embodiments, specialized compare circuits may be implemented within the communication device 100a for performing the analysis.

Figure 2B:
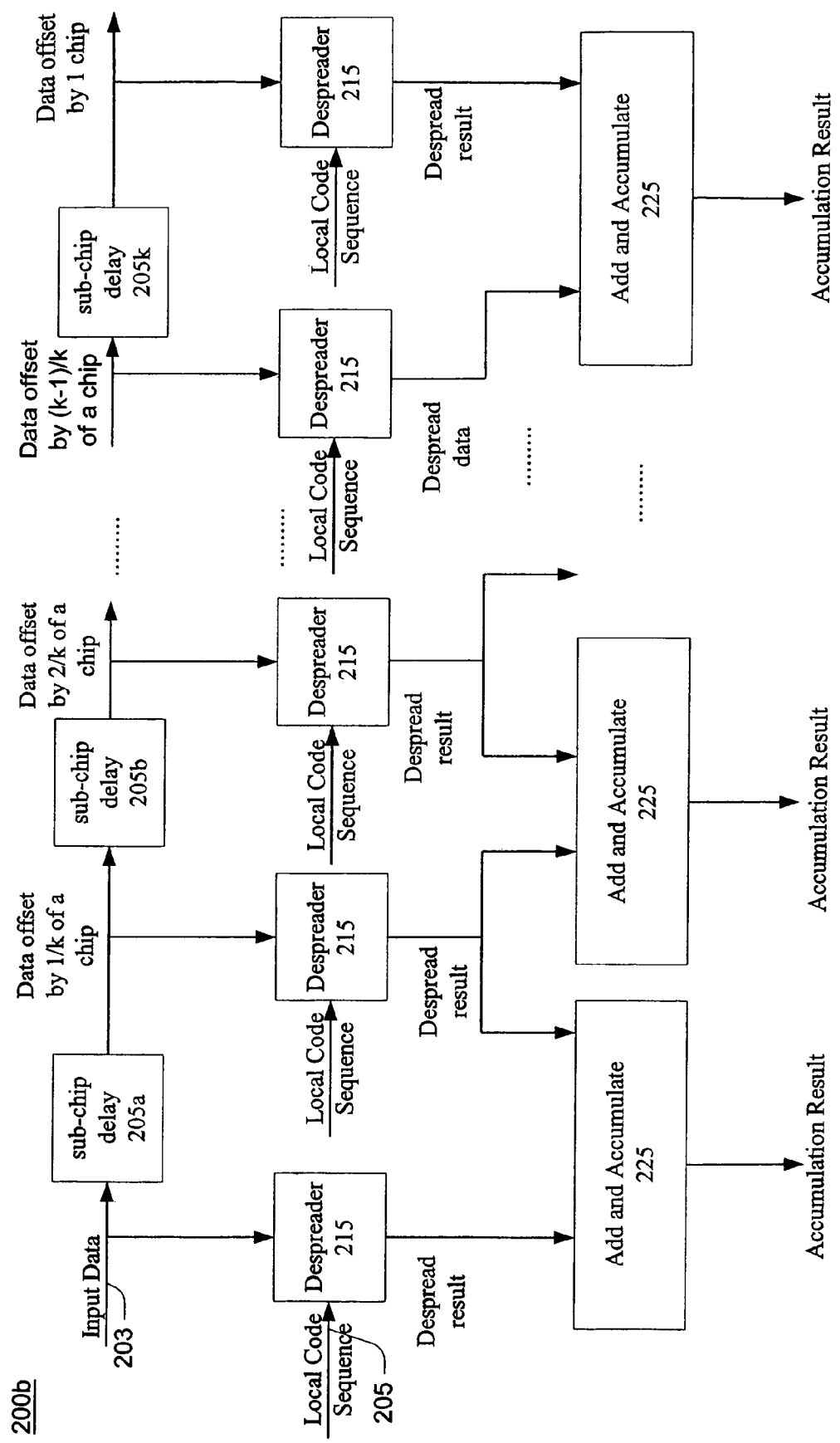
FIG. 2B is a block diagram illustrating a sub-chip correlation circuit according to another embodiment of the present invention.

FIG. 2B is a block diagram illustrating an apparatus 200b for performing sub-chip correlation in accordance with another embodiment of the present invention. The apparatus 200b is similar to the apparatus 200a, except that fewer despreader circuits 215 are used. Specifically, the offset data streams generated by the sub-chip delay circuits 205a-205k are each provided to one despreader circuit 215. The despreader circuits 215 then despread the data stream with a locally generated code sequence to produce despread results. The despread results (except the data stream offset by one chip) are each provided to two sum-and-accumulate circuits 225. The input data stream and the data stream offset by one chip are each provided to one of the sum-and-accumulate circuits 225. The despread results generated from adjacent sub-chip delayed data streams are provided to sum-and-accumulated circuits 225 to be added. The sums of the despread results are then accumulated over a pre-determined period of time or a pre-determined number of iterations of the correlation process. The accumulated results thus generated are then provided to other logic of the base band processor 106a for further processing. For instance, the accumulated results may be provided to comparators for comparing against pre-determined threshold values when determining whether there is a code match.

Figure 3:
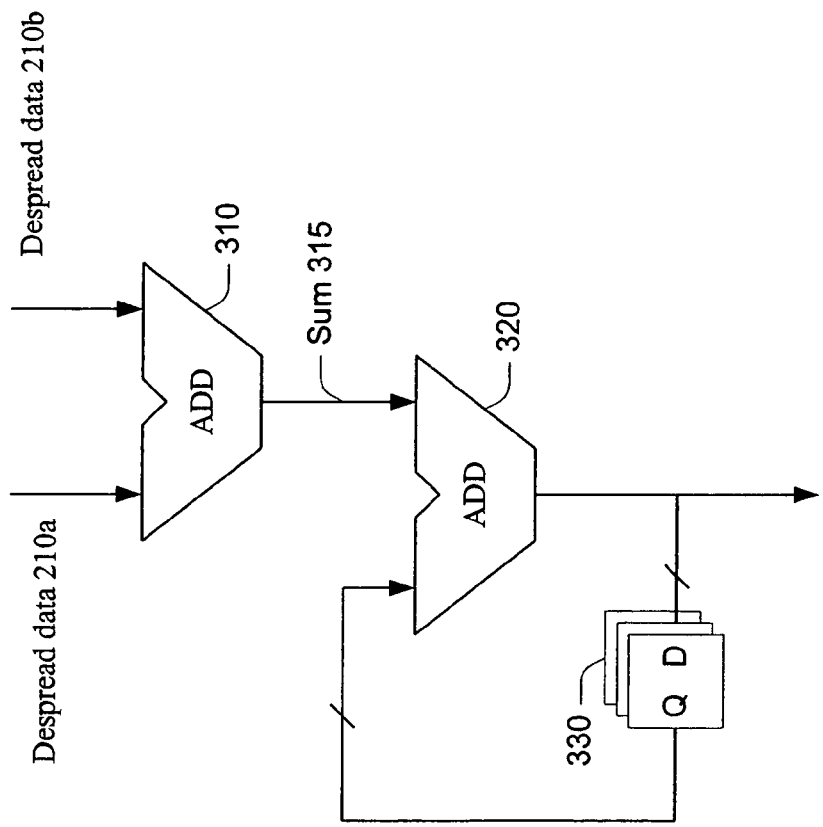
FIG. 3 is a block diagram illustrating a sum-and-accumulate circuit in accordance with an embodiment of the present invention.

FIG. 3 depicts an exemplary implementation of a sum-and-accumulate circuit 300, including two adders 310 and 320 and storage elements 330 (e.g., D flip-flops). Adder 310 receives despread results 210a-210b from two despreader circuits, and produces a sum 315. In the present embodiment, the despread results 210a-210b are generated based on data streams that are offset by a fraction of a chip. Thus, the sum 315 represents a sum of the despread results from two sub-chip offset data streams. The sum 315 is then accumulated by adder 320 over a pre-determined period of time to produce an accumulated result 220a.

It should be appreciated that the sum-and-accumulate circuit of FIG. 3 is for illustration purposes only, and that many different implementations of the sum-and-accumulate circuit are possible and within the scope of the present invention.

Apparatus for Performing Half-Chip Offset Correlation

Figure 4:
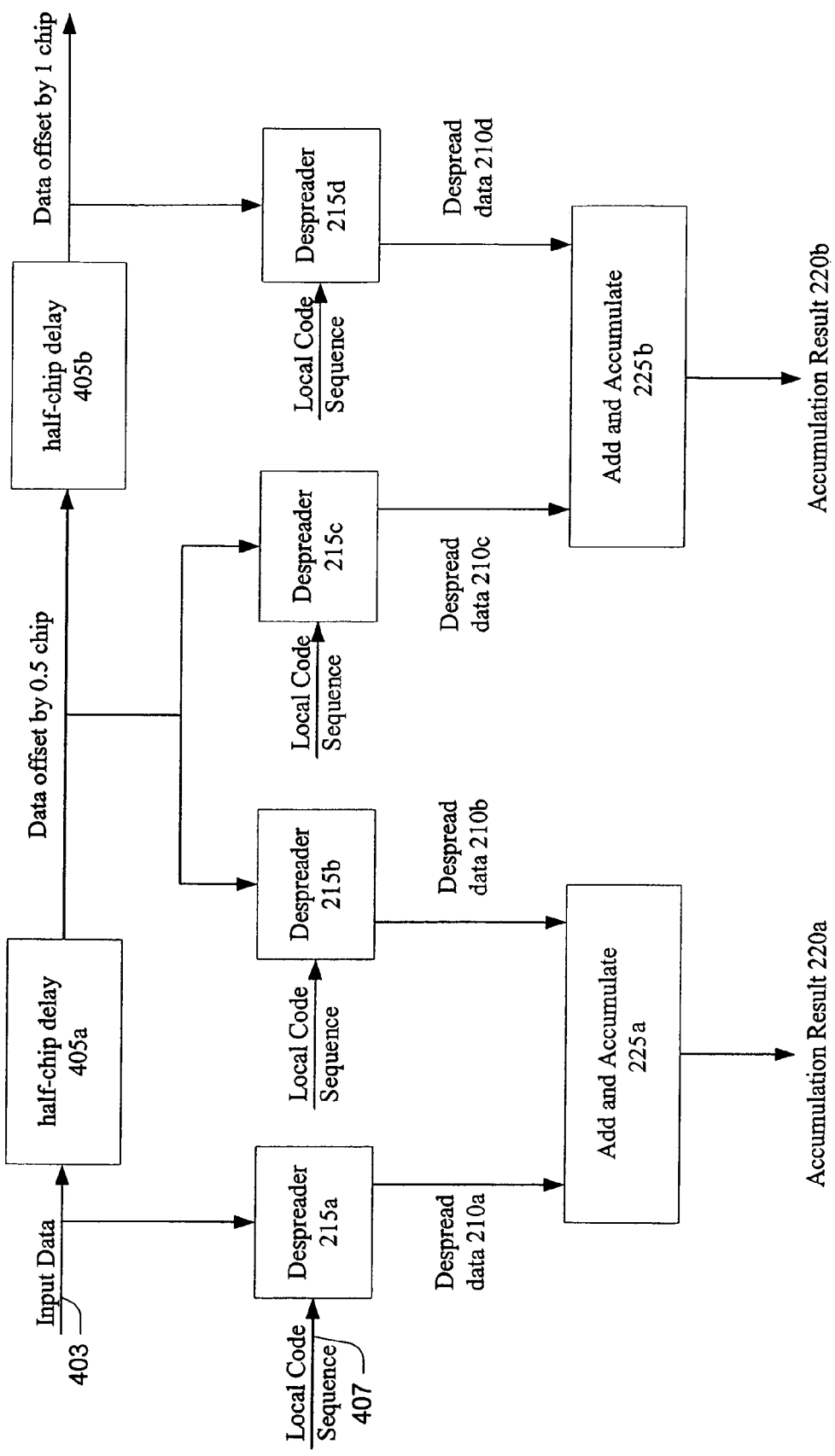
FIG. 4 is a block diagram illustrating a sub-chip correlation circuit according to an embodiment of the present invention.

FIG. 4 illustrates an apparatus 400 for correlating data streams that are offset by a half of a chip according to one embodiment of the invention. As illustrated, input data is received by the apparatus on bus 403 and is applied to a half-chip delay circuit 405a and a despread circuit 215a, which also receives a local code sequence on bus 407. The despread circuit 215a despreads the non-delayed input data with the local code to produce a first despread result.

The half-chip delay circuit 405a produces a data sequence that is offset by half a chip relative to the input data sequence on bus 403. The offset data sequence is then applied to despread circuits 215b and 215c. The offset data sequence is despread at despread circuit 215b with the local code to produce a second despread result. A third despread result is produced by despread circuit 215c. The first despread result from the despread circuit 215a is then added with the second despread result from the despread circuit 215b at sum-and-accumulate circuit 225a. The sums of the first and second despread results are accumulated over a pre-determined period of time to produce a first accumulated result.

The correlation circuit 225b receives a third despread result from the despread circuit 215c, which despreads the initially delayed input data with the local code to produce a third despread result. The half-chip delay circuit 405b produces a data sequence that is offset by one chip. The offset data sequence is then provided to despread circuit 215d. Despread circuit 215d despreads the offset data sequence with the local codes to produce a fourth despread result. The third despread result from the despread circuit 215c is added to the fourth despread result from the despread circuit 215d at the sum-and-accumulate circuit 225b. The sum of the third and fourth despread results are accumulated over a pre-determined period of time to produce a second accumulated result. According to the present embodiment, the first and second accumulated results are then provided to other circuits of the communication device to be analyzed.

ALTERNATE EMBODIMENTS

The present invention, an apparatus and method for sub-chip offset correlation for spread-spectrum systems, has thus been disclosed. The foregoing descriptions of specific embodiments of the present invention are presented for purposes of illustration and description. They are not intended to be exhaustive or to limit the invention to the precise forms disclosed. Many modifications and variations are possible in view of the above teachings. For example, in another embodiment, the input for the local code sequence and the input for the local code sequence may be reversed. That is, the input of the local code sequence can be used to receive the input data sequence, and the input for the incoming data can be used to receive the local code sequence. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An apparatus for correlating a first sequence of data with a local code sequence, comprising:
    a first sub-chip delay circuit that receives the first sequence of data and outputs a second sequence of data that is a version of the first sequence delayed by a predetermined fraction of a chip;
    a second sub-chip delay circuit connected to receive the second sequence of data and output a third sequence of data that is a version of the second sequence delayed by a predetermined fraction of a chip;
    a first despreader circuit that receives the local code sequence and the first sequence of data and outputs a first despread data;
    a second despreader circuit that receives the local code sequence and the second sequence of data and outputs a second despread data;
    a third despreader circuit that receives the local code sequence and the third sequence of data and outputs a third despread data;
    a first summing circuit for receiving said first and said second despread data; and
    a second summing circuit for receiving the second and the third despread data.

2. An apparatus as claimed in claim 1 and further comprising:
    at least one further sub-chip delay circuit connected in series with the output of said second sub-chip delay circuit, each said at least one further serially connected sub-chip delay circuit receiving as an input the output of the preceding connected sub-chip delay circuit in the series of sub-chip delay circuits and outputting a version of the received sequence of data delayed by fraction of a chip;
    at least two further despreader circuits each for receiving the local code sequence and the output of the delayed version of the data sequence of each of two of said sub-chip delay circuits that are connected to each other in the series of sub-chip delay circuits; and
    at least one further summing circuit for receiving the despread data from output of each said at least two despreader circuits.

3. An apparatus as claimed in claim 2 wherein the output of each of said sub-chip delay circuits except the last in the series is applied to two despreader circuits and the output of each of said two despreader circuits is applied to a respective summing circuit that receives the despread data produced from the delayed sequence of data of two of said sub-chip delay circuits connected to each other in the series.

4. An apparatus as claimed in claim 2 wherein the input to each of said sub-chip delay circuits in the series of sub-chip delay circuits except the first in the series is applied to a respective despreader circuit that outputs despread data to each of two summing circuits, each of said two summing circuits receiving the despread data produced from the delayed sequence of data outputs of two successive sub-chip delay circuits in the series.

5. An apparatus as claimed in claim 1 wherein said first and second sub-chip delay circuits each have a delay of 0.5 of a chip.

6. A communication device, comprising:
    a receiver circuit for receiving a signal that is spread with a first code sequence;
    a base-band processor having a code generator for generating a local code sequence; and
    a searcher, wherein the searcher comprises:
        (a) a circuit for generating a first data sequence from the signal;
        (b) a first sub-chip delay circuit for generating a second data sequence from the signal, wherein the first data sequence and the second data sequence are offset by a fraction of a chip;
        (c) a first despreader for spreading the first data sequence with the local code sequence to produce a first despread result;
        (d) a second despreader for spreading the second data sequence with the local code sequence to produce a second despread result;
        (e) a first sum-and-accumulate circuit for adding the first despread result and the second despread result to produce a first summed result and for accumulating the first summed result over a pre-determined period of time to generate a first accumulated result;

(f) a second sub-chip delay circuit for generating a third data sequence from the signal, wherein the third data sequence and the first data sequence are offset by two fractions of a chip;

(g) a third despreader for spreading the third data sequence with the local code sequence to produce a third despread result; and (h) a second sum-and-accumulate circuit for adding the second despread result and the third despread result to produce a second summed result and for accumulating the second summed result over the pre-determined period of time to produce a second accumulated result, wherein the base-band processor is configured for analyzing the first accumulated result to determine whether the first code sequence matches the local code sequence.

7. The communication device of claim 6, wherein the base-band processor analyzes the first accumulated result and the second accumulated result to determine the sub-chip offset of the first code sequence.

8. An apparatus for performing code correlation, comprising:

a first sub-chip delay circuit for generating a second data sequence that is offset by one half of a chip relative to a first data sequence;

a second sub-chip delay circuit for generating a third data sequence that is offset by one half of a chip relative to the second data sequence and by one chip relative to the first data sequence;

a code generator for generating a local code sequence;

a first despreader circuit for despreading the first data sequence with the local code sequence to produce a first despread result;

a second despreader circuit for despreading the second data sequence with the local code sequence to produce a second despread result; and a third despreader circuit for despreading the second offset data sequence with the local code sequence to produce a third despread result;

a first sum-and-accumulate circuit for adding the first despread result with the second despread result to produce a first summed result, and for accumulating the first summed result over a pre-determined period of time to generate a first accumulated result; and a second sum-and-accumulate circuit for adding the second despread result with the third despread result to produce a second summed result and for accumulating the second summed result over the pre-determined period of time to generate a second accumulated result.

9. A communication device, comprising:

a receiver circuit for receiving a signal that is spread with a first code sequence;

a base-band processor having a code generator for generating a local code sequence and a searcher comprising:

(a) a circuit for generating a first data sequence from the signal, (b) a first sub-chip delay circuit for generating a second data sequence from the signal, wherein the first data sequence and the second data sequence are offset by one half of a chip, (c) a second sub-chip delay circuit for generating a third data sequence from the signal, wherein the third data sequence and the first data sequence are offset by one chip, (d) a first despreader for spreading the first data sequence with the local code sequence to produce a first despread result, (e) a second despreader for spreading the second data sequence with the local code sequence to produce a second despread result, (f) a third despreader for spreading the third data sequence with the local code sequence to produce a third despread result, (g) a first sum-and-accumulate circuit for adding the first despread result and the second despread result to produce a first summed result and for a the first summed result over a pre-determined period of time to generate a first accumulated result, and (h) a second sum-and-accumulate circuit for adding the second despread result and the third despread result to produce a second summed result and for accumulating the second summed result over the pre-determined period of time to produce a second accumulated result, wherein the base-band processor is configured for analyzing the first accumulated result to determine whether the local code sequence matches the first code sequence.

* * * * *

UNITED STATES PATENT AND TRADEMARK OFFICE
CERTIFICATE OF CORRECTION

| | | |
|---|---|---|
| PATENT NO. | : 7,280,582 B2 | Page 1 of 1 |
| APPLICATION NO. | : 11/101171 | |
| DATED | : October 9, 2007 | |
| INVENTOR(S) | : Joel D. Medlock | |

It is certified that error appears in the above-identified patent and that said Letters Patent is hereby corrected as shown below:

Title page, item [56]:

Under References Cited, the PTO did not include the following references:

--6,330,272      12/2001        Lomp--

--6,359,875      3/2002         Hamada et al.--

At column 1, line 44, "station," should read --station;--

At column 6, line 9, After "$(A_i + B_i)$" insert --.--.

In the Claims:

In Claim 9, column 10, line 33, "for a the first" should read --for the first--

Signed and Sealed this

Fourth Day of March, 2008

JON W. DUDAS
*Director of the United States Patent and Trademark Office*